July 8, 1947.　　　　C. T. WILLSON　　　　2,423,806
TRACTION DEVICE FOR VEHICLE WHEELS
Filed Nov. 7, 1945
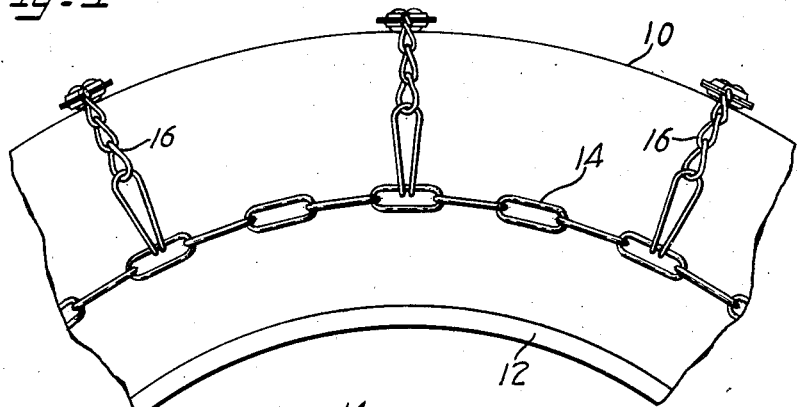
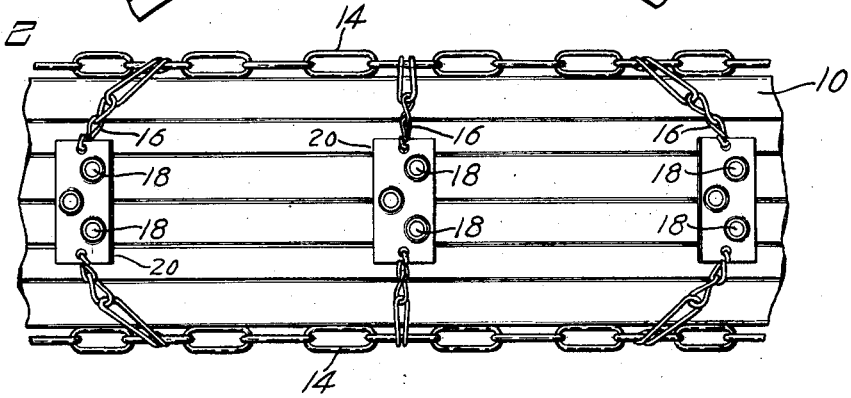
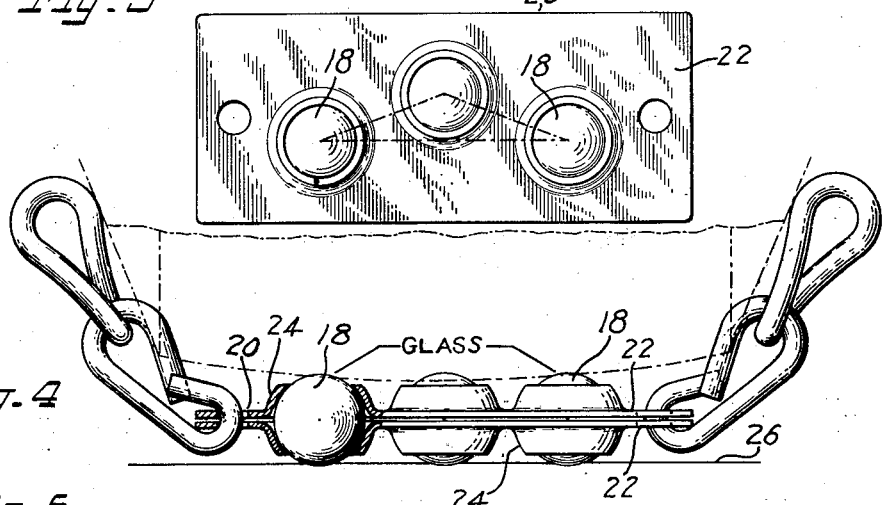
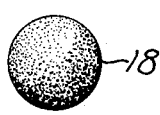
Inventor
Charles T. Willson
By S. Jay Teller
Attorney Patented July 8, 1947

2,423,806

UNITED STATES PATENT OFFICE 2,423,806

TRACTION DEVICE FOR VEHICLE WHEELS

Charles T. Willson, Canaan, Conn.

Application November 7, 1945, Serial No. 627,219

16 Claims. (Cl. 152—226)

A device embodying the invention is particularly adapted for use with or as a part of a tire chain of conventional form, and it will be so shown and described, but it is to be understood that such a device is not so limited as to use and that it may be used with or as a part of other types of traction devices adapted for use with vehicle wheels having rubber tires.

Conventional tire chains have cross elements consisting of interconnected metallic links and many different forms of links have been proposed and used to provide traction for the tire, particularly on ice. A tire chain such as commonly used has a large number of points or areas which simultaneously engage the road surface with the result that the pressure is widely distributed and is relatively small at each individual point or area of contact. Furthermore, the metallic links wear rapidly, and after a short period of use any initially rounded points are worn or abraded, so that the chain presents a relatively large number of smooth flat faces to the icy road surface, thus still further reducing the unit pressure at any one point or area of contact.

I have found that glass of suitable quality constitutes a highly advantageous material for engaging the road surface to provide traction. Glass is particularly suitable for this purpose for the reason that normal wear or abrasion causes it to become rough and remain rough, its ice gripping quality thus being maintained and even enhanced as the result of wear. This is in contrast with the ordinary metallic elements of traction devices which tend to become smooth as the result of wear, thus decreasing their ice gripping quality. One of the objects of the invention is to provide a traction device for the purpose described wherein glass members are provided for contacting and engaging an icy road surface to provide traction.

A further object of the invention is to provide a traction device of the type mentioned wherein the road engaging elements are hard balls providing very high pressures at relatively few points. These balls are preferably formed of glass, but may be formed of other materials having approximately equivalent hardness.

A still further object of the invention is to provide a traction device including hard balls as above described, and so constructed that the balls can shift about their own centers to present successively different portions to the road surface. In this way the balls retain their spherical shapes notwithstanding wear.

Other objects of the invention will be apparent from the following specification and claims.

In the drawing I have shown in detail a preferred embodiment of the invention, but it will be understood that various changes may be made from the construction shown, and that the drawing is not to be construed as defining or limiting the scope of the invention, the claims forming a part of this specification being relied upon for that purpose.

Of the drawing,

Fig. 1 is a fragmentary side view of a tire with a tire chain thereon incorporating the invention.

Fig. 2 is a plan view of the tire and chain as shown in Fig. 1.

Fig. 3 is an enlarged face view of that portion of the traction device to which the invention more particularly relates.

Fig. 4 is an edge view partly in section of the parts shown in Fig. 3, this view also showing the cooperative relationship of the device with the tire and with the road surface.

Fig. 5 is a detail view showing one of the glass balls and illustrating its condition after a short period of usage.

Referring to the drawing, 10 represents a vehicle tire of any usual or preferred form and 12 represents the rim on which the tire is mounted. Carried by the tire 10 is a tire chain which in large part is or may be of conventional design. As shown, it comprises two side elements 14, 14 and a plurality of cross elements 16, 16.

Each of the cross elements 16 comprises a series of links, the end links of which are connected with the side elements 14, 14. Included in the series of links is a means for holding one or more road engaging members. In accordance with one phase of the invention the road engaging members are formed of glass and as concerns the broader aspects of the invention the glass member may be variously shaped.

As shown, each cross element has one or more hard balls 18, 18 which are preferably, but not necessarily, formed of glass. If the balls are formed otherwise than of glass they should be formed of a material having a hardness approximating that of glass. Three such balls are shown and this number is preferred. For holding the balls in position with respect to the tire so that they will be interposed between the tire and the road surface as the wheel rotates, a suitable holding means or cage 20 is provided which is connected in the series of links constituting the cross member 16. The member or cage 20 comprises two separate plates 22, 22 which are preferably similar in form, but oppositely positioned. These plates are apertured to receive the several balls 18, 18 and flanges 24, 24 are provided around the apertures so as to partly enclose the balls to retain them. When three balls are provided they are preferably so arranged that their centers are at the apexes of a triangle such as that indicated by dot-and-dash lines in Fig. 3. This arrangement provides each cross element with a three point contact with the road surface and tends to hold the cage 20 in parallelism with the road surface. Preferably, the balls 18, 18 are loosely held by the flanges 24, 24 so that the balls are free to shift about their own centers as the wheel rotates.

It will be observed that Fig. 4 shows the member 20 at its lowermost position with the balls in contact at their tops with the tire 10 and in contact at their bottoms with a road surface 26 which may be assumed to have a layer of smooth ice thereon. It will be seen that in this position the entire portion of the weight of the vehicle which is carried by the particular wheel is concentrated on the bottoms of the balls which theoretically provide point contacts. Inasmuch as the cage is held in fixed position with respect to the tire, by means of the cross links, the balls cannot roll, and the high pressure contact with the ice provides firm traction.

While I do not limit myself as to any theory or explanation of the effective traction of the balls, it is believed that the high pressure exerted by the balls melts the ice to a limited extent, thus forming shallow recesses in which the balls are entered. These recesses prevent the balls from sliding on the ice.

Inasmuch as the balls are loosely mounted in the cage 20, they are free to shift about their own centers when out of contact with the road surface, so that successively different portions thereof are presented to the road surface at each contact therewith. In accordance with standard practice the entire chain is somewhat loose on the tire and gradually shifts circumferentially with respect thereto, thus avoiding excessive wear on the tire at any particular positions. This shifting of the chain tends to facilitate and in fact to cause the shifting or rotation of the balls about their own centers.

A traction device such as that shown is not always used on icy roads and must sometimes be used, frequently for long intervals, on concrete or other roads which tend to cause wear. As is well known, this wear is rapidly destructive of the ordinary chains formed exclusively of metal parts, but I have found that with hard balls, particularly glass balls, wear takes place relatively slowly, this being due to a considerable extent to the fact that the balls are constantly shifting, thus preventing wear at any one place. Furthermore, the wear that takes place with ordinary chains consisting wholly of metallic parts produces numerous small flat surfaces which are very smooth and which are not adapted to grip the ice. Thus, the chains rapidly become less efficient as wear increases. However, with hard balls the wear is not only very slow but is distributed over the entire surfaces thereof, the balls maintaining their spherical shapes without forming flats.

Furthermore, glass balls, even though initially smooth, become rough with wear and remain rough irrespective of the amount of wear. This is illustrated in Fig. 5 which is intended to show a glass ball after a reasonable amount of use. Even though the ball may have initially been smooth the surface is roughened as the result of the wear and this roughened surface serves to very substantially increase the coefficient of friction between the glass ball and the ice.

The balls may eventually be reduced in diameter to such an extent as to no longer serve their intended purpose. They may be removed and replaced by new balls, by opening one of the connecting links so as to permit the plates to be separated sufficiently to permit the substitution of new balls.

What I claim is:

1. A traction device for a vehicle wheel having a rubber tire, the said device comprising in combination, a member formed of glass, and means for holding the glass member in position with respect to the tire so as to be interposed between the tire and the road surface as the wheel rotates.

2. A traction device for a vehicle wheel having a rubber tire, the said device comprising in combination, a ball having hardness approximating that of glass, and means for holding the ball in position with respect to the tire so as to be interposed between the tire and the road surface as the wheel rotates.

3. A traction device for a vehicle wheel having a rubber tire, the said device comprising in combination, a glass ball, and means for holding the ball in position with respect to the tire so as to be interposed between the tire and the road surface as the wheel rotates.

4. A traction device for a vehicle wheel having a rubber tire, the said device comprising in combination, a ball having hardness approximating that of glass, and a cage for holding the ball in position with respect to the tire so as to be interposed between the tire and the road surface as the wheel rotates, the said cage holding the ball loosely so as to permit it to shift in position about its own center when not in engagement with the road surface in order to present successively different portions to the road surface.

5. A traction device for a vehicle wheel having a rubber tire, the said device comprising in combination, a glass ball positioned to be interposed between the tire and the road surface as the wheel rotates, and a cage for loosely engaging the ball so as to hold it in fixed relation to the tire during engagement with the road surface and so as to permit it to shift in position about its own center when not in engagement with the road surface in order to present successively different portions to the road surface.

6. A traction device for a vehicle wheel having a rubber tire, the said device comprising in combination, a plurality of balls having hardness approximating that of glass positioned to be interposed between the tire and the road surface as the tire rotates, and means for holding the said balls in fixed relation to each other at all times and in fixed relation to the tire during engagement with the road surface.

7. A traction device for a vehicle wheel having a rubber tire, the said device comprising in combination, a plurality of glass balls positioned to be interposed between the tire and the road surface as the tire rotates, and means for holding the said balls in fixed relation to each other at all times and in fixed relation to the tire during engagement with the road surface.

8. A traction device for a vehicle wheel having a rubber tire, the said device comprising in combination, a plurality of balls having hardness approximating that of glass, and means for holding the balls in fixed relation with each other with their centers at apexes of a triangle and for holding them in such positions with respect to the tire that they are interposed between the tire and the road surface as the tire rotates.

9. A traction device for a vehicle wheel having a rubber tire, the said device comprising in combination, a plurality of balls having hardness approximating that of glass, and a cage for holding the balls in fixed relation with each other with their centers at apexes of a triangle and for holding them in such positions with respect to the tire that they are interposed between the tire and the road surface as the tire rotates, the said cage holding the balls loosely so as to permit them to shift in positions about their own centers when not in engagement with the road surface in order to present successively different portions to the road surface.

10. A traction device for a vehicle wheel having a rubber tire, the said device comprising in combination, a plurality of glass balls, and a cage for holding the balls in fixed relation with each other with their centers at apexes of a triangle and for holding them in such positions with respect to the tire that they are interposed between the tire and the road surface as the tire rotates, the said cage holding the glass balls loosely so as to permit them to shift in positions about their own centers when not in engagement with the road surface in order to present successively different portions to the road surface.

11. A traction device for a vehicle wheel having a rubber tire, the said device comprising in combination, a plurality of hard balls positioned to be to interposed between the tire and the road surface as the tire rotates, and a cage comprising two apertured plates for holding the said balls in fixed relation to each other at all times and in fixed relation to the tire during engagement with the road surface.

12. A tire chain comprising circumferential side elements and a plurality of cross elements connecting the side elements, each of the cross elements including a ball having hardness approximately that of glass and means for holding the ball in position with respect to the tire so as to be interposed between the tire and the road surface as the tire rotates.

13. A tire chain comprising circumferential side elements and a plurality of cross elements connecting the side elements, each of the cross elements including a ball having hardness approximately that of glass and a cage for holding the ball in position with respect to the tire so as to be interposed between the tire and the road surface as the tire rotates, the said cage holding the ball loosely so as to permit it to shift in position about its own center when not in engagement with the road surface in order to present successively different portions to the road surface.

14. A tire chain comprising circumferential side elements and a plurality of cross elements connecting the side elements, each of the cross elements including a glass ball and a cage for holding the glass ball in position with respect to the tire so as to be interposed between the tire and the road surface as the tire rotates, the said cage holding the glass ball loosely so as to permit it to shift in position about its own center when not in engagement with the road surface in order to present successively different portions to the road surface.

15. A tire chain comprising circumferential side elements and a plurality of cross elements connecting the side elements, each of the cross elements including a plurality of balls having hardness approximating that of glass and a cage for holding the balls in fixed relation to each other and in such positions with respect to the tire as to be interposed between the tire and the road surface as the tire rotates, the said cage holding the balls loosely so as to permit them to shift in positions about their own centers when not in engagement with the road surface in order to present successively different portions to the road surface.

16. A tire chain comprising circumferential side elements and a plurality of cross elements connecting the side elements, each of the cross elements including a plurality of balls having hardness approximating that of glass and a cage for holding the balls in fixed relation to each other with their centers at the apexes of a triangle and for holding the balls in such positions with respect to the tire as to be interposed between the tire and the road surface as the tire rotates, the said cage holding the balls loosely so as to permit them to shift in positions about their own centers when not in engagement with the road surface in order to present successively different portions to the road surface.

CHARLES T. WILLSON.

REFERENCES CITED

The following references are of record in the file of this patent:

UNITED STATES PATENTS

| Number | Name | Date |
| --- | --- | --- |
| 1,810,191 | Stueckle | June 16, 1931 |

FOREIGN PATENTS

| Number | Country | Date |
| --- | --- | --- |
| 18,217 | Australia | Feb. 4, 1929 |